United States Patent
Ji et al.

(10) Patent No.: US 11,019,340 B2
(45) Date of Patent: May 25, 2021

(54) METHODS AND DEVICES FOR CONTEXT SET SELECTION

(71) Applicant: VELOS MEDIA, LLC, Plano, TX (US)

(72) Inventors: Tianying Ji, Albany, CA (US); Nguyen Nguyen, Seattle, WA (US); Dake He, Waterloo (CA)

(73) Assignee: Velos Media, LLC, Dallas, TX (US)

( * ) Notice: Subject to any disclaimer, the term of this patent is extended or adjusted under 35 U.S.C. 154(b) by 0 days.

(21) Appl. No.: 16/112,992

(22) Filed: Aug. 27, 2018

(65) Prior Publication Data

US 2018/0367795 A1 Dec. 20, 2018

Related U.S. Application Data

(63) Continuation of application No. 15/419,167, filed on Jan. 30, 2017, now Pat. No. 10,075,717, which is a (Continued)

(51) Int. Cl.
*H04N 19/129* (2014.01)
*H04N 19/176* (2014.01)
(Continued)

(52) U.S. Cl.
CPC ......... *H04N 19/129* (2014.11); *H04N 19/176* (2014.11); *H04N 19/184* (2014.11);
(Continued)

(58) Field of Classification Search
CPC .. H04N 19/129; H04N 19/176; H04N 19/184; H04N 19/186; H04N 19/51; H04N 19/593; H04N 19/60
See application file for complete search history.

(56) References Cited

U.S. PATENT DOCUMENTS 8,098,735 B2 * 1/2012 Benzreba ............. H04N 19/176
                                                            341/107
2006/0233447 A1 * 10/2006 Matsubara ............. H04N 19/42
                                                            382/233

(Continued)

FOREIGN PATENT DOCUMENTS

WO       2008/108534       9/2008
WO       2011128303       10/2011

OTHER PUBLICATIONS

European Office Action dated May 3, 2013.
(Continued)

*Primary Examiner* — MD N Haque
(74) *Attorney, Agent, or Firm* — Spencer C. Patterson; Grable Martin Fulton PLLC

(57) ABSTRACT

Methods of encoding and decoding for video data are described for encoding or decoding multi-level significance maps. Distinct context sets may be used for encoding the significant-coefficient flags in different regions of the transform unit. In a fixed case, the regions are defined by coefficient group borders. In one example, the upper-left coefficient group is a first region and the other coefficient groups are a second region. In a dynamic case, the regions are defined by coefficient group borders, but the encoder and decoder dynamically determine in which region each coefficient group belongs. Coefficient groups may be assigned to one region or another based on, for example, whether their respective significant-coefficient-group flags were inferred or not.

18 Claims, 12 Drawing Sheets

Related U.S. Application Data continuation of application No. 13/354,485, filed on Jan. 20, 2012, now Pat. No. 9,584,812.

(51) Int. Cl.
*H04N 19/51* (2014.01)
*H04N 19/184* (2014.01)
*H04N 19/186* (2014.01)
*H04N 19/60* (2014.01)
*H04N 19/593* (2014.01)

(52) U.S. Cl.
CPC .......... *H04N 19/186* (2014.11); *H04N 19/51* (2014.11); *H04N 19/60* (2014.11); *H04N 19/593* (2014.11)

(56) References Cited

U.S. PATENT DOCUMENTS

| | | | |
|---|---|---|---|
| 2008/0219578 A1* | 9/2008 | Lee | H03M 7/4006 382/247 |
| 2009/0175331 A1 | 7/2009 | Karczewicz | |
| 2012/0008675 A1* | 1/2012 | Karczewicz | H04N 19/61 375/240.02 |
| 2012/0328012 A1* | 12/2012 | Sasai | H04N 19/196 375/240.12 |
| 2013/0107969 A1* | 5/2013 | Nguyen | H04N 19/61 375/240.18 |

OTHER PUBLICATIONS

Bross B., et al., "WD4: Working Draft 4 of High-Efficiency Video Coding", JCT-VC Meeting, Jul. 14, 2011.

CIPO, CA Office Action relating to Application No. 2,802,285, dated Dec. 9, 2014.

Korean Patent Office, Korean Office Action relating to Application No. 10-2013-0005252, dated Feb. 12, 2014.

Nguyen N, et al., "Multi-Level Significant Maps for Large Transform Units", 7. JCT-VC Meeting, Nov. 9, 2011.

Sole J., et al., "CE11: Unified Scans for the Significance Map and Coefficient Level Coding in High Efficiency", 6. JCT-VC Meeting, Jul. 15, 2011.

Extended European Search Report dated May 3, 2013, EP13153297.0.

EPO, Office Action dated Jun. 8, 2016 relating to EP application No. 12151965.6.

Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.

B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC1/SC29/WG11, 6th Meeting, Torino, Jul. 2011.

F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.

T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.

B. Bross, W-J Han, J-R Ohm, G. J. Sullivan, and T. Wiegand, "WD5: Working Draft 4 of High-Efficiency Video Coding," JCTVC-G1103_d4, JCT-VC of ITU-T SG16 WP3 and ISO/IEC JTC1/SC29/WG11, 7th Meeting, Geneva, Nov. 2011.

V. Sze, JCTVC-G917 "On significance map coding for CABAC" JCT-VC of ITU-T SG16 WP3 and ISO/IEC JTC1/SC29/WG11, 7th Meeting, Geneva, Nov. 2011.

T. Ikai, JCTVC-G308, "Complexity reduction of significant map coding" JCT-VC of ITU-T SG16 WP3 and ISO/IEC JTC1/SC29/WG11, 7th Meeting, Geneva, Nov. 2011.

Extended European Search Report relating to application No. 12151965.6 dated Apr. 12, 2012.

Auyeung C et al.: "Non-Cell: Context Reduction of Significance Map Coding with CABAC", 7. JCT-VC Meeting; 98. MPEG Meeting Geneva; (Joint Collaborative Team on Video Coding of ISO/IEC JTC1/SC29/WG11 and ITU-T SG. 16), No. JCTVC-G366, Nov. 9, 2011.

Nguyen N et al.: "Multi-Level Significant Maps for Large Transform Units", 7. JCT-VC Meeting; 98. MPEG Meeting; Geneva; (Joint Collaborative Team on Video Coding of ISO/IEC JTC1/SC29/WG11 and ITU-T SG. 16), No. JCTVC-G644, Nov. 9, 2011.

T-D Chuang et al: "Non-Cell: Blocked-Based Significance Map Context Selection", 8. JCT-VC Meeting; 99. MPEG Meeting; San Jose; (Joint Collaborative Team on Video Coding of ISO/IEC JTC1/SC29/WG11 and ITU-T SG. 16), No. JCTVC-H0285, Jan. 20, 2012.

European Patent Office, Communication pursuant to Article 94(3) EPC, relating to EP application No. 12151965.6, dated Nov. 6, 2012.

CIPO, CA Office Action relating to Application No. 2,802, 285, dated Oct. 27, 2015.

Intellectual Property of India, relating to application No. 105/CHE/2013, First Examination Report dated Oct. 4, 2018.

* cited by examiner xCG

|  | 0 | 1 | 2 | 3 |
|---|---|---|---|---|
| 0 | SCGflag=1 (inferred) | SCGflag=1 (inferred) | SCGflag=1 (inferred) | SCGflag=1 |
| 1 | SCGflag=1 (inferred) | SCGflag=1 (inferred) | SCGflag=1 | |
| 2 | SCGflag=1 | SCGflag=1 | SCGflag=1 | |
| 3 | SCGflag=0 | SCGflag=0 | | | yCG

| 1 | 1 | 1 | 2 |
|---|---|---|---|
| 1 | 1 | 2 | 2 |
| 2 | 2 | 2 | 2 |
| 2 | 2 | 2 | 2 |

220

FIG. 8 xCG

|  | 0 | 1 | 2 | 3 |
|---|---|---|---|---|
| 0 | SCGflag=1 (inferred) | SCGflag=1 | SCGflag=1 (inferred) | SCGflag=1 |
| 1 | SCGflag=1 | SCGflag=1 (inferred incorrect) | SCGflag=1 |  |
| 2 | SCGflag=1 | SCGflag=1 | SCGflag=1 |  |
| 3 | SCGflag=0 | SCGflag=0 |  |  | yCG

FIG. 9

| 1 | 2 | 1 | 2 |
|---|---|---|---|
| 2 | 1 | 2 | 2 |
| 2 | 2 | 2 | 2 |
| 2 | 2 | 2 | 2 |

FIG. 10

METHODS AND DEVICES FOR CONTEXT SET SELECTION

CROSS-REFERENCE TO RELATED APPLICATIONS

The present application is a continuation of patent application Ser. No. 15/419,167, filed Jan. 30, 2017, which is a continuation of patent application Ser. No. 13/354,485, filed Jan. 20, 2012, now granted as U.S. Pat. No. 9,584,812, the contents of both of which are hereby incorporated by reference.

FIELD

The present application generally relates to data compression and, in particular, to methods and devices for encoding and decoding video using significance maps.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC). The initiative may eventually result in a video-coding standard commonly referred to as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that MPEG-H will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for MPEG-H, the quantized transform coefficients are encoded by (a) encoding a last significant coefficient position indicating the location of the last non-zero coefficient in the transform unit, (b) encoding a significance map indicating the positions in the transform unit (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

Transform units are typically N×N. Common sizes include 4×4, 8×8, 16×16, and 32×32, although other sizes are possible, including non-square sizes in some embodiments, such as 16×4, 4×16, 8×32 or 32×8. The entropy encoding of the symbols in the significance map is based upon a context model. In the case of 4×4 or 8×8 luma or chroma blocks or transform units (TU), a separate context is associated with each coefficient position in the TU. The encoder and decoder must keep track of and look up a large number of different contexts during the encoding and decoding of the significance map. In the case of larger TUs, the context for encoding a significant flag may depend on the values of neighboring significance flags. For example, the flag may have a context selected from four or five contexts depending on the values of neighboring flags. In some instances, particular flags within a TU or sub-block of a TU may have a context based on position, such as the upper-left (DC) position.

BRIEF DESCRIPTION OF THE DRAWINGS

Reference will now be made, by way of example, to the accompanying drawings which show example embodiments of the present application, and in which:

FIG. 7 shows an example transform unit divided into contiguous coefficient groups and example respective significant-coefficient-group flags for those coefficient groups;

FIG. 8 shows an example of a dynamically determined division of a 16×16 transform unit into regions based on the example of FIG. 7;

FIG. 9 shows the example of FIG. 7, with inference correction;

FIG. 10 shows the dynamic division of the transform unit into regions based on the example of FIG. 9;

Similar reference numerals may have been used in different figures to denote similar components.

DESCRIPTION OF EXAMPLE EMBODIMENTS

Figure 1:
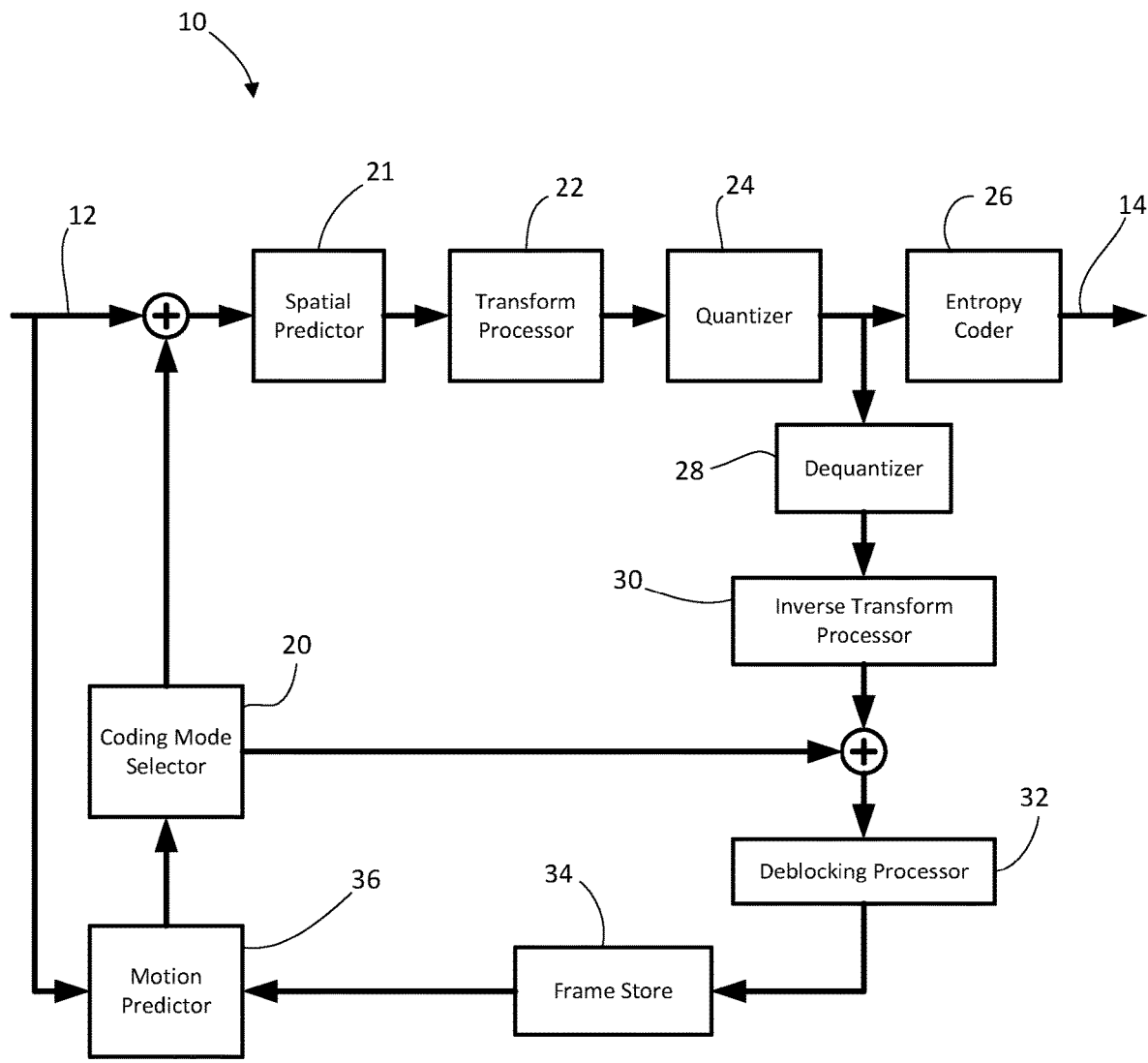
FIG. 1 shows, in block diagram form, an encoder for encoding video.

The present application describes methods and encoders/decoders for encoding and decoding significance maps with context-adaptive encoding or decoding. The encoder and decoder use multi-level significance maps. In at least one case, the multi-level maps are used with larger transform units, such as the 16×16 and 32×32 TUs.

In one aspect, the present application describes a method of decoding a bitstream of encoded video by reconstructing significant-coefficient flags for a transform unit, the transform unit comprising a sequence of blocks, the bitstream encoding sets of significant-coefficient flags, each set corresponding to a respective block. The method includes, for one of the sets of significant-coefficient flags, selecting a context set for use in decoding significant-coefficient flags of that set based on a position within the transform unit of the block corresponding to that set of significant-coefficient flags; and decoding the significant-coefficient flags of that set using the selected context set.

In another aspect, the present application describes a method of decoding a bitstream of encoded video by reconstructing significant-coefficient flags for a transform unit, the transform unit comprising a sequence of blocks, the bitstream encoding sets of significant-coefficient flags, each set corresponding to a respective block. The method includes, for one of the sets of significant-coefficient flags, determining a significant-coefficient-group flag for that set; selecting a context set for use in decoding significant-coefficient flags of that set by selecting a first context set if the significant-coefficient group flag was decoded from the bitstream, and selecting a different context set if the significant-coefficient group flag was determined based on the significant-coefficient group flags of at least two neighboring sets of significant-coefficient flags; and decoding the significant-coefficient flags of that set using the selected context set.

In one embodiment, determining includes determining that the significant-coefficient-group flag is equal to 1.

In a further embodiment, determining includes inferring that the significant-coefficient-group flag is equal to 1 based on a right-neighbor set of significant-coefficient flags having a significant-coefficient-group flag equal to 1 and a below-neighbor set of significant-coefficient flags equal to 1. In some implementations this method further includes, after the decoding, determining whether the set contains all zero coefficients and, if so, revising the significant-coefficient-group flag for the set to equal 0 for use in subsequently determining whether to infer significant-coefficient-group flags of adjacent sets of significant-coefficient flags.

In yet another embodiment, determining comprises decoding the significant-coefficient-group flag from the bitstream since either a right-neighbor set of significant-coefficient flags has a significant-coefficient-group flag equal to 0 or a below-neighbor set of significant-coefficient flags equal to 0.

In a further embodiment, the first context set includes a number of contexts, wherein selecting the first context set comprises setting a context index variable to a predetermined value, and wherein selecting the second context set comprises setting the context index variable to the predetermined value plus the number of contexts.

In another aspect, the present application describes a method of encoding a video by encoding significant-coefficient flags for a transform unit to create a bitstream of encoded sets of significant-coefficient flags, the transform unit comprising a sequence of blocks, each set of significant-coefficient flags corresponding to a respective block. The method includes, for one of the sets of significant-coefficient flags, determining a significant-coefficient-group flag for that set; selecting a context set for use in encoding significant-coefficient flags of that set by selecting a first context set if the significant-coefficient group flag was encoded for insertion into the bitstream, and selecting a different context set if the significant-coefficient group flag was determined based on the significant-coefficient group flags of at least two neighboring sets of significant-coefficient flags; and encoding the significant-coefficient flags of that set using the selected context set.

In another aspect, the present application describes a method of decoding a bitstream of encoded video by reconstructing significant-coefficient flags for a transform unit, the transform unit comprising a sequence of blocks in a scan order, the bitstream encoding groups of significant-coefficient flags, each group corresponding to a respective block, each block having an associated significant-coefficient-group flag that indicates whether that block is presumed to contain at least one non-zero significant-coefficient flag or whether the significant-coefficient flags corresponding to that block may be inferred to be zero. The method includes, on a block-by-block basis, in the scan order, for a current block, determining a significant-coefficient-group flag for the current block; if the significant-coefficient-group flag is determined to be zero, setting all associated significant-coefficient flags in the current block to zero; if the significant-coefficient-group flag is determined to be non-zero, then, for at least one significant-coefficient flag of the current block, if a significant-coefficient-group flag associated with a block to the right of the current block and a significant-coefficient-group flag associated with a block below the current block are both non-zero, then selecting a context from a first context set, and otherwise, selecting a context from a different, mutually exclusive, context set, and entropy decoding the at least one significant-coefficient flag using the selected context.

In yet a further aspect, the present application describes a method of decoding a bitstream of encoded video by reconstructing significant-coefficient flags for a transform unit, the transform unit being partitioned into non-overlapping blocks, the bitstream encoding significant-coefficient-group flags and sets of significant-coefficient flags, where each set corresponds to a respective block, where each significant-coefficient group flag indicates whether its associated block is presumed to contain at least one non-zero significant-coefficient flag. The method may include determining that a significant-coefficient group flag is set; for the set of significant-coefficient flags corresponding to that significant-coefficient-group flag, selecting a context set from among two or more different context sets, each context set including a plurality of contexts, based on a position within the transform unit of the block corresponding to that set of significant-coefficient flags; and entropy decoding each significant-coefficient flag of that set of significant coefficient flags by selecting a respective context from that selected context set.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing MPEG-H standard. Those ordinarily skilled in the art will understand that the present application is not limited to H.264/AVC or MPEG-H but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

The present application describes example processes and devices for encoding and decoding significance maps. A significance map is a block, matrix or group of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

It will be understood, in light of the following description, that the multi-level encoding and decoding structure might be applied in certain situations, and those situations may be determined from side information like video content type (natural video or graphics as identified in sequence, picture, or slice headers). For example, two levels may be used for natural video, and three levels may be used for graphics (which is typically much more sparse). Yet another possibility is to provide a flag in one of the sequence, picture, or slice headers to indicate whether the structure has one, two, or three levels, thereby allowing the encoder the flexibility of choosing the most appropriate structure for the present content. In another embodiment, the flag may represent a content type, which would be associated with the number of levels. For example, a content of type "graphic" may feature three levels.

Note that the present application may use the terms "coefficient group" and "set of significant-coefficient flags" interchangeably. They are intended to have the same meaning.

Figure 2:
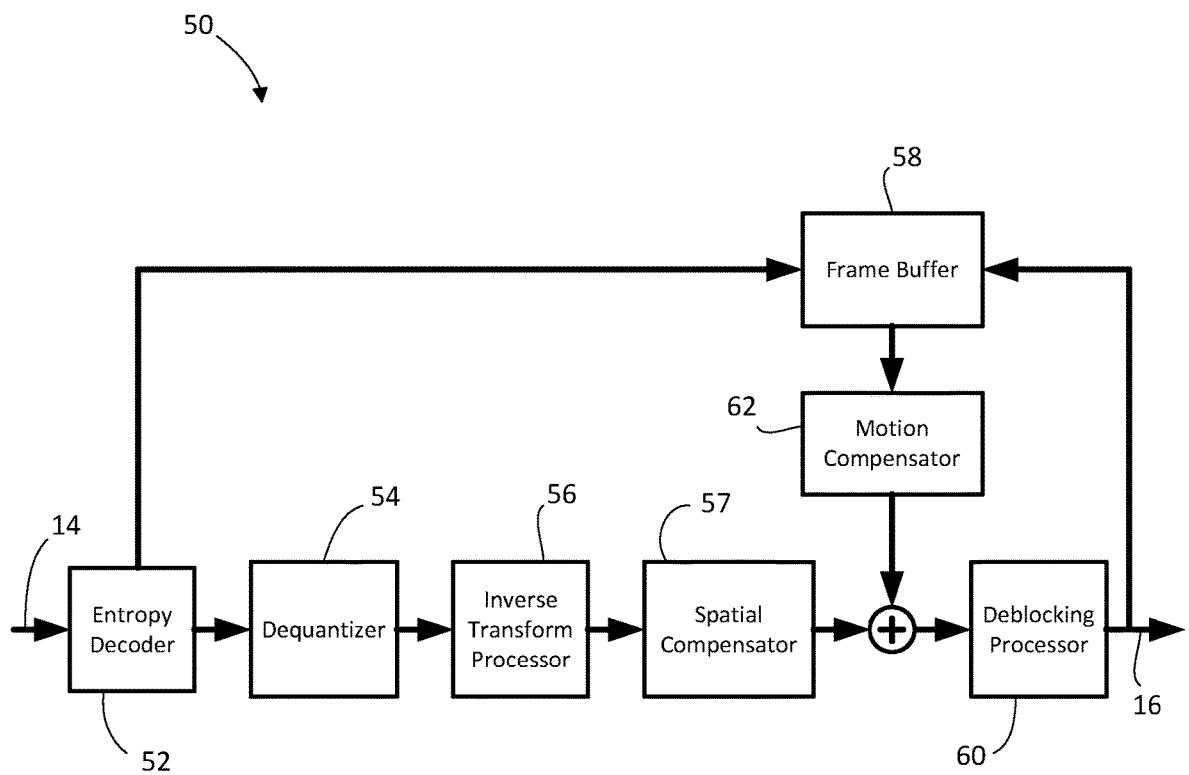
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like MPEG-H.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit"

(TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that MPEG-H-compliant encoders and decoders will have many of these same or similar features.

Significance Map Encoding

As noted above, the entropy coding of a block or set of quantized transform domain coefficients includes encoding the significance map (e.g. a set of significant-coefficient flags) for that block or set of quantized transform domain coefficients. The significance map is a binary mapping of the block indicating in which positions (other than the last position) non-zero coefficients appear. The significance map may be converted to a vector in accordance with the scan order (which may be vertical, horizontal, diagonal, zig zag, or any other scan order). The scan is typically done in "reverse" order, i.e. starting with the last significant coefficient and working back through the significant map in reverse direction until the flag in the upper-left corner at [0,0] is reached. In the present description, the term "scan order" is intended to mean the order in which flags, coefficients, or groups, as the case may be, are processed and may include orders that are referred to colloquially as "reverse scan order".

Each significant-coefficient flag is then entropy encoded using the applicable context-adaptive coding scheme. For example, in many applications a context-adaptive binary arithmetic coding (CABAC) scheme may be used.

With 16×16 and 32×32 significance maps, the context for a significant is (mostly) based upon neighboring significant-coefficient flag values. Among the contexts used for 16×16 and 32×32 significance maps, there are certain contexts dedicated to the bit position at [0,0] and (in some example implementations) to neighboring bit positions, but most of the significant-coefficient flags take one of four or five contexts that depend on the cumulative values of neighboring significant-coefficient flags. In these instances, the determination of the correct context for a significant-coefficient flag depends on determining and summing the values of the significant-coefficient flags at neighboring locations (typically five locations, but it could be more or fewer in some instances).

In previous work, the present applicants described the use of multi-level significance maps, in which the significance map of a transform unit is partitioned into coefficient groups and each coefficient group is encoded in a predefined order or sequence. Within each coefficient group (which may be a block/sub-block) the significant-coefficient flags are processed in a scan order. Each coefficient group is associated with a significant-coefficient-group flag, which indicates whether that coefficient group may be considered to contain non-zero significant-coefficient flags. Reference may be made to U.S. patent application Ser. No. 13/286,336, filed Nov. 1, 2011, entitled "Multi-level Significance Maps for Encoding and Decoding"; and U.S. patent application Ser. No. 61/561,872, filed Nov. 19, 2011, entitled "Multi-level Significance Map Scanning". The contents of both applications are hereby incorporated by reference.

Figure 3:
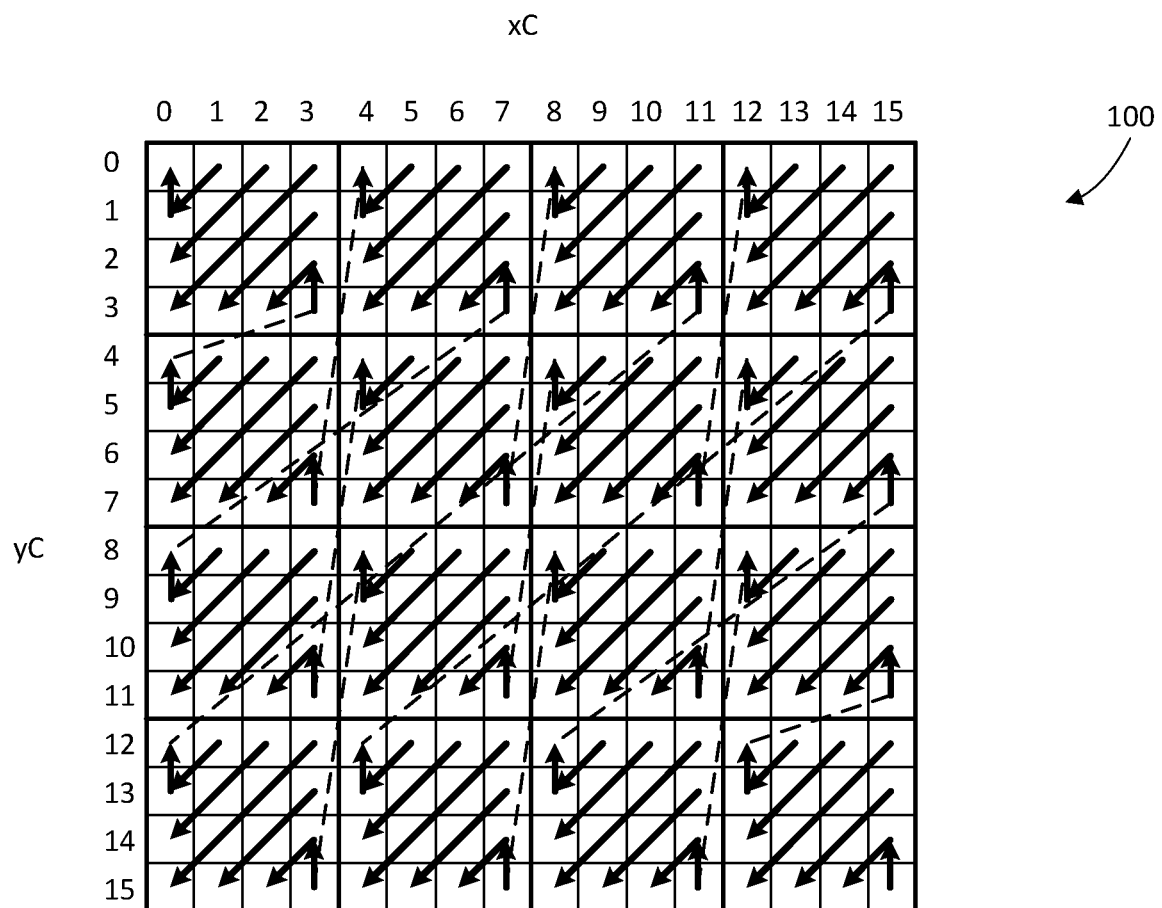
FIG. 3 shows, an example of a multi-level scan order for a 16×16 transform unit.

One of the techniques described in the foregoing applications is implementation of a one-pass scanning process; i.e. a group-based or multi-level scanning order. Reference is now made to FIG. 3, which shows a 16×16 transform unit 100 with a multi-level diagonal scan order illustrated. The transform unit 100 is partitioned into sixteen contiguous 4×4 coefficient groups or "sets of significant-coefficient flags". Within each coefficient group, a diagonal scan order is applied within the group, rather than across the whole transform unit 100. The sets or coefficient groups themselves are processed in a scan order, which in this example implementation is also a diagonal scan order. It will be noted that the scan order in this example is illustrated in "reverse" scan order; that is, the scan order is shown progressing from the bottom-right coefficient group in a downward-left diagonal direction towards the upper-left coefficient group. In some implementations the same scan order may be defined in the other direction; that is, progressing in am upwards-right diagonal direction and when applied during encoding or decoding may be applied in a "reverse" scan order.

The use of multi-level significance maps involves the encoding of an L1 or higher level significance map that indicates which coefficient groups may be expected to contain non-zero significant-coefficient flags, and which coefficient groups contain all zero significant-coefficient flags. The coefficient groups that may be expected to contain non-zero significant-coefficient flags have their significant-coefficient flags encoded, whereas the coefficient groups that contain all zero significant-coefficient flags are not encoded (unless they are groups that are encoded because of a special case exception because they are presumed to contain at least one non-zero significant-coefficient flag). Each coefficient group has a significant-coefficient-group flag (unless a special case applies in which that coefficient group has a flag of a presumed value, such as the group containing the last significant coefficient, the upper left group, etc.).

The coefficient-group flags are either determined based on the content of the coefficient group, i.e. based on whether there are, in fact, any non-zero coefficients within the coefficient group; or, the coefficient-group-flag is inferred. For example, in at least one embodiment, the coefficient-group flag is set to zero if there are no non-zero coefficients in the coefficient group and is set to one if there is at least one non-zero coefficient in the coefficient group; however, to save bits in some cases a coefficient-group flag is not encoded and decoded but rather is inferred based on the value of neighboring coefficient-group flags. For instance, in one embodiment a coefficient-group flag is inferred to be 1 if the lower neighboring coefficient-group flag and the right neighboring coefficient-group flag are both equal to 1.

Context-Based Processing of Significant-Coefficient Flags

The encoding and decoding of the significant-coefficient flags is based on is context-based. In other words, the encoding and decoding depends on determining an estimated probability that the bin being encoded is a most-probable symbol (MPS). That determination of estimated probability depends, in turn, upon determining a context for the current symbol. Typically, the context-based encoder and decoder work in accordance with a context model that specifies how context it to be determined for particular types of data, and that defines a set of contexts.

In the case of significant-coefficient flags, the context model bases the context determination on the values of neighboring significant-coefficient flags (except for particular exceptions, like the DC value at [0,0]). For example with size 16×16 or 32×32 transform units, the context of significant-coefficient flag "x" is dependent upon five neighboring flags as follows:

The cumulative sum of the values of the five neighboring flags may be used to indicate the context for the significant-coefficient flag at position x. Accordingly, there may be up to six contexts. In some instances, the number of contexts may be capped, for example at 4. An example context determination model is as follows:

context_x=(sum_neighbor_flags+1)/2

The above context_x is a context index to a "context set" for encoding significant-coefficient flags. That is, when determining the context for encoding a particular significant-coefficient flag, the context is selected from one of the contexts defined in the context set.

In some example implementations, more than one context set may be defined by the model for encoding significant-coefficient flags. For example, the encoder and decoder may use one context set for encoding significant-coefficient flags falling into a first region of the transform unit and a second separate context set for encoding significant-coefficient flags falling into a second region (or a third region, etc.) of the transform unit.

Working with the example above, the contexts from the second set may include contexts 4, 5, 6, and 7, and selection of the appropriate context for a particular significant-coefficient flag in the second region may be based on a context determination model of:

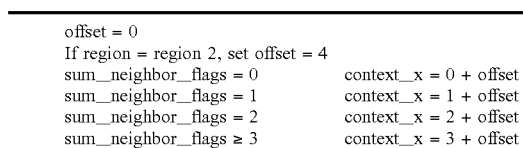

Figure 4:
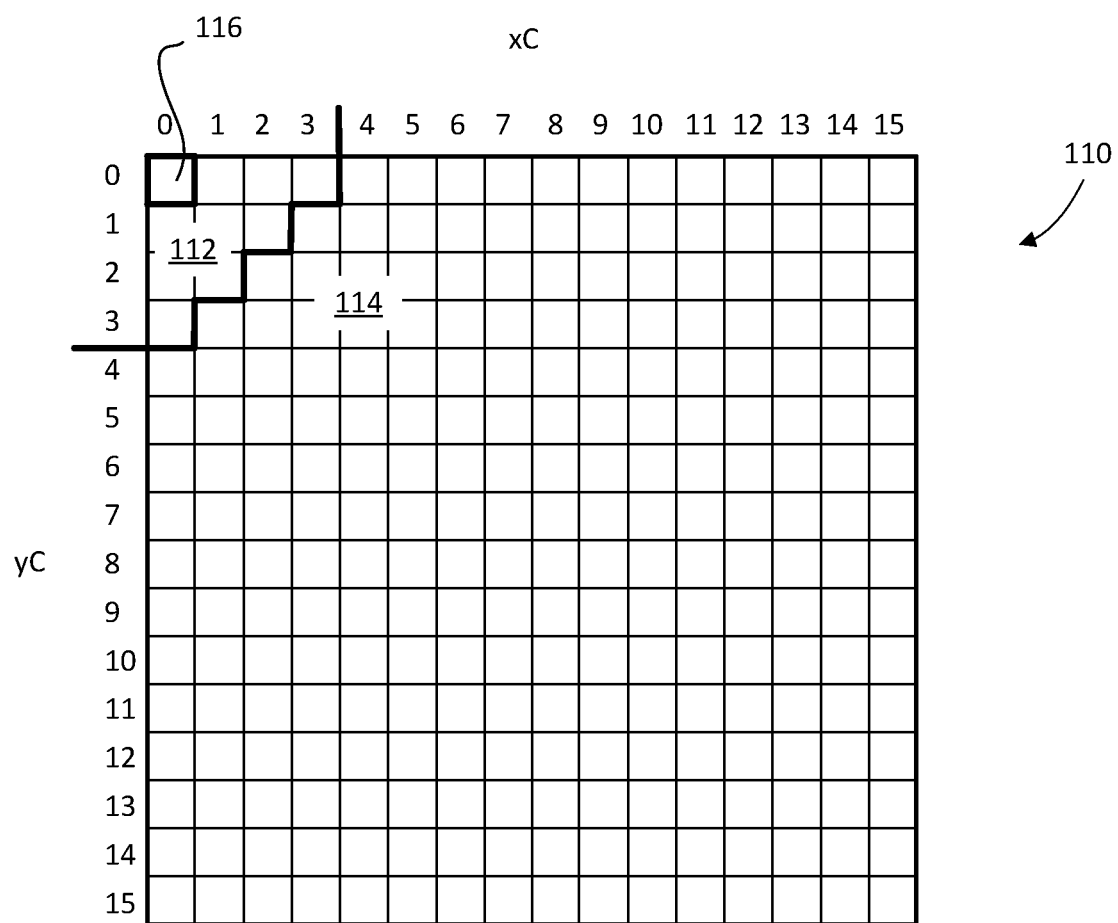
FIG. 4 illustrates the division of a 16×16 transform unit into two fixed regions using a defined diagonal.

In some current implementations, a transform unit is divided into a first region and a second region for the purpose of context determination using a fixed diagonal definition. For example, with a 16×16 transform unit, the diagonal is defined by x+y=4. This results in a region such as that shown in FIG. 4, which illustrates an example 16×16 transform unit 110. The example transform unit 110 includes a first region 112 and a second region 114, divided in accordance with the x+y<4 diagonal definition. That is, all significant-coefficient flags for which x+y<4 are in the first region 112. In this case, the DC value at [0,0] has its own context. In some sense, the DC location may be considered a "third region" in which there is a single context in the context set.

Figure 5:
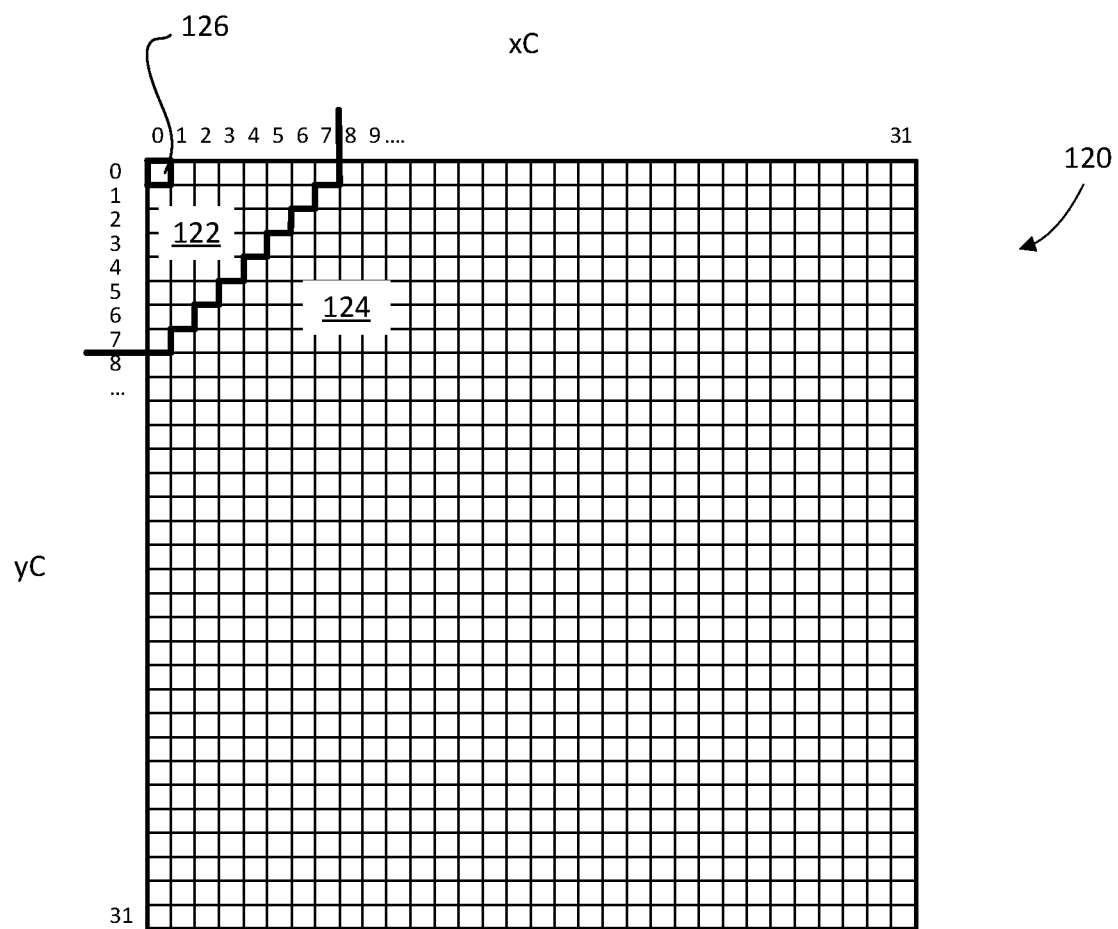
FIG. 5 illustrates the division of a 32×32 transform unit into two fixed regions using a defined diagonal.

Reference is now made to FIG. 5, which shows an example of a 32×32 transform unit 120. The transform unit 120 is divided or partitioned into a first region 122 and a second region 124 in accordance with a diagonal definition of x+y<8. That is, all significant-coefficient flags for which x+y<8 are in the first region 122, except the DC significant-coefficient flag 126, and are those significant-coefficient flags are encoded using a first context set. All other significant-coefficient flags for which x+y≥8 are in the second set and are encoded using a second context set. The DC significant-coefficient flag 126 is encoded using its own context. In this sense the DC position may be considered a third region by itself.

The present application provides other approaches to selecting a context set for encoding the significant-coefficient flags of a transform unit.

In a first embodiment, the context set selection is fixed, like with the diagonal definition examples given above; however, in this first embodiment, the first region is not defined by a diagonal. Instead the first region is defined to correspond to a coefficient group definition. In this manner, the context set selection is coefficient-group based, which improves the modularity of significant-coefficient encoding in a multi-level significance map embodiment. Multiple regions could be defined, each of them being delimited by coefficient group boundaries. The DC position can be considered as a region.

Figure 6:
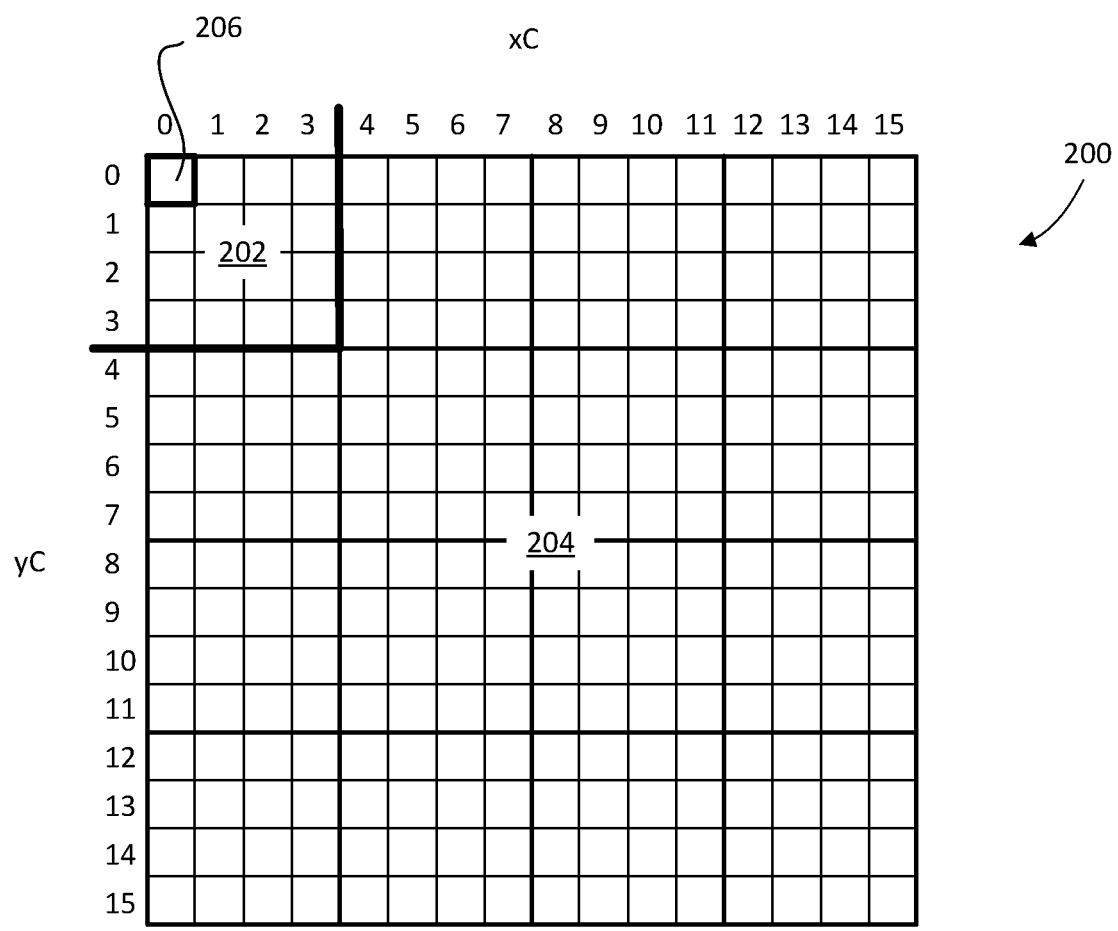
FIG. 6 illustrates a coefficient-group based division of a 16×16 transform unit into regions for selecting a context set.

FIG. 6 shows an example of a 16×16 transform unit 200 divided or partitioned into context regions based on coefficient-group definitions. In this example, a first region 202 includes all significant-coefficient flags within the first coefficient group (may also be considered the last coefficient group in reverse scan order), excluding the DC significant-coefficient flag 206. That is the first region 202 includes all significant-coefficient flags for which x<4 and y<4, excluding [0,0]. All significant-coefficient flags within the other coefficient groups of the transform unit 200 are in a second region 204. The significant-coefficient flags within the first region 202 are encoded using a first context set while the significant-coefficient flags within the second region 204 are encoded using a second context set. In one example implementation, the encoder and/or decoder determines whether a significant-coefficient flags is within the first region, i.e. in the upper-left coefficient group, by determining whether an x-coordinate and a y-coordinate of the flag are each within 4 positions of the upper-left corner of the transform unit.

In other variations, the first region may include more than one coefficient group. For example, in a 32×32 transform unit, if the coefficient groups are 4×4, then the first region may include the three or four coefficient groups in the upper left corner of the transform unit. Or, in another example, the 16×16 transform unit 200 may include three or more coefficient groups in the first region 202. Other variations will be appreciated in light of the present description.

In this first embodiment, the encoder and decoder process significant-coefficient flags by determining their context using a context set selected based on the coefficient group in which the significant-coefficient flags belong. The position of the coefficient group within the transform unit determines the context set selected. That is, each coefficient group within the transform unit is associated with a certain context set, i.e. each coefficient group is a member of one of the defined regions, and each region has an associated context set.

In a second embodiment, the regions are still coefficient-group based, but the boundary between the first and second regions is determined dynamically. In one example of this second embodiment, the division is based upon whether the coefficient-group flag of a particular coefficient group was inferred to 1 or not. That is, the coefficient-group is assigned to a region based upon the coefficient-group flags of its right and bottom neighboring coefficient groups.

Reference is made to FIG. 7, which diagrammatically shows a 16×16 transform unit 220 divided into 4×4 contiguous sets of significant-coefficient flags, i.e. coefficient groups. The coefficient groups may be indexed using the x-y coordinates shown (x=0, . . . , 3; y=0, . . . , 3). The significant-coefficient-group flag (SCGflag) determined for each of the coefficient groups is shown in the diagram inside the respective coefficient group.

As will be appreciated from the foregoing discussion, the transform unit 220 contains a last-significant-coefficient (LSC) in one of the coefficient groups. For the purposes of this example, the LSC is presumed to be in coefficient group [2, 2]. All groups prior to the coefficient group [2, 2] in scan order necessarily contain all zeros.

The significant-coefficient group flag for coefficient group [2, 2] is necessarily 1, since it contains the LSC, which means it contains at least one non-zero coefficient.

In the example shown, the next coefficient group in reverse scan order is coefficient group [1, 3], which contains all zero coefficients. Accordingly, its significant-coefficient-group flag is a 0.

The next coefficient groups in reverse scan order, groups [3, 0], [2, 1], and [1, 2] are all found to contain at least one non-zero coefficient. Accordingly, each of them has a significant-coefficient-group flag of 1. Coefficient group [0, 3] is found to contain all zero coefficients, so its significant-coefficient-group flag is determined to be 0.

The next group in reverse scan order is coefficient group [2, 0]. Because its right-neighbor coefficient group and its lower-neighbor coefficient group both have SCGflag=1, the significant-coefficient-group flag for coefficient group [2, 0] is inferred or assumed to be 1, irrespective of whether there are any non-zero coefficients in coefficient group [2, 0] or not. The same inference is made with coefficient group [1, 1]. Coefficient group [0, 2] has a lower-neighbor with a significant-coefficient-group flag of zero, so no inference is made. In the case of coefficient group [0, 2], it is found to contain a non-zero coefficient so its significant-coefficient-group flag is set to 1. All remaining coefficient groups in reverse scan order have significant-coefficient group flags that are inferred to be 1.

Any of the inferred significant-coefficient-groups flags need not be encoded in the bitstream or decoded at the decoder. They are assumed to be equal to 1, and the encoder and decoder automatically encode the significant-coefficient flags of those coefficient groups, even if one of them contains all zero coefficients.

Reference is now also made to FIG. 8, which shows the dynamic region division for an example illustration of the second embodiment based on the transform unit 220 shown in FIG. 7. In this second embodiment, a first region (indicated by the symbol '1' in the coefficient groups belonging to the first region) for encoding the significant-coefficient flags is defined as including those coefficient groups for which the significant-coefficient-group flag is inferred to be 1. A second region (indicated by the symbol '2' in the coefficient groups belonging to the second region) contains those coefficient groups that have a significant-coefficient-group that was not inferred. It will be understood that those coefficient groups for which the significant-coefficient-group flag is zero need not be included in a region since the significant-coefficient flags of those groups are not encoded. The DC position 226 may still have its own context and, thus, is not necessarily considered part of the first region.

From the foregoing description it will be appreciated that the first and second regions have a boundary along coefficient group borders, but the location of which dynamically changes from transform unit to transform unit, dependent upon the content of the transform unit in question. By maintaining the separation of the regions along coefficient group boundaries some efficiency in modular processing and code simplification may be achievable. The dynamic movement of the boundary may improve the speed with which the respective context sets associated with the two regions converge towards a probability distribution reflective of actual statistical data, thereby improving the rate at which coding efficiency is improved.

It will be appreciated that one mechanism for implementing the foregoing region determination process would be to assign each coefficient group to a region based upon the significant-coefficient group flags of its right and lower neighbor coefficient groups. That is, if either of the significant-coefficient group flags of the right and lower neighbor coefficient groups equal 0, then the coefficient group belongs in region two; otherwise, it belongs in region one. The upper-left corner coefficient group may always be classified in region one in some embodiments.

A third embodiment is now described, which may be considered a variation or refinement of the second embodiment. In the third embodiment, the boundary between the regions is still dynamically determined based upon whether significant-coefficient-groups were inferred to be 1 or not, and the boundary continues to lie along coefficient group boundaries; however, the third embodiment includes assessing whether the inference was accurate or not and making adjustments to the categorization of later coefficient groups based upon a reclassification of the incorrect inference.

Reference is now made to FIG. 9, which shows an example transform unit 250. In this case, the determination of significant-coefficient-group flags for the various coefficient groups occurs as described above in connection with FIG. 7. However, in this case, the encoder and decoder evaluate whether the inferences were accurate or not. For example, the coefficient group [1, 1] may, in fact, contain all zero coefficients. These coefficients are actually encoded in the bitstream and are decoded by the decoder because the significant-coefficient-group flag is set to 1, although by incorrect inference or assumption.

In FIG. 9, this is indicated as 'inferred incorrect'.

At the time of decoding the significant-coefficient flags for coefficient group [1, 1], the decoder would not be aware that the inference is incorrect and, accordingly, would understand this coefficient group to be part of the first region since it has an inferred significant-coefficient-group flag. Accordingly, the encoder and decoder both use the context set associated with the first region when encoding and decoding the significant-coefficient flags of coefficient group [1, 1]. However, when it comes to processing subsequent coefficient groups the encoder and decoder may take this knowledge of the incorrect inference into account. For example, when determining the significant-coefficient group flags for coefficient groups [1, 0] and [0, 1], they can consider their neighbor coefficient group at [1, 1] as having a significant-coefficient group flag equal to 0, even though it actually used an inferred flag equal to 1 and had its significant-coefficient flags encoded. As shown in FIG. 9, the coefficient groups [1, 0] and [0, 1] have their significant-coefficient-group flags set to 1 based on the fact that they actually contain at least one non-zero coefficient.

It will be appreciated that this 'correction' of the incorrect inference for processing later coefficient groups may be limited to correcting the inference for the purpose of assigning coefficient groups to regions only, or it may also be corrected for the purpose of actually determining the significant-coefficient flag for those later coefficient groups that may have relied upon the incorrect inference in making another inference.

As a result, the number of coefficient groups for which an inference was used to determine the significant-coefficient-group flag changes to just three. This has an impact upon the shape of the regions used for selecting context sets for encoding the significant-coefficient flags. FIG. 10 shows the transform unit 250 with the first and second regions indicated thereon. It will be noted that the coefficient groups that make up a region need not be continuous or contiguous in this case.

Figure 11:
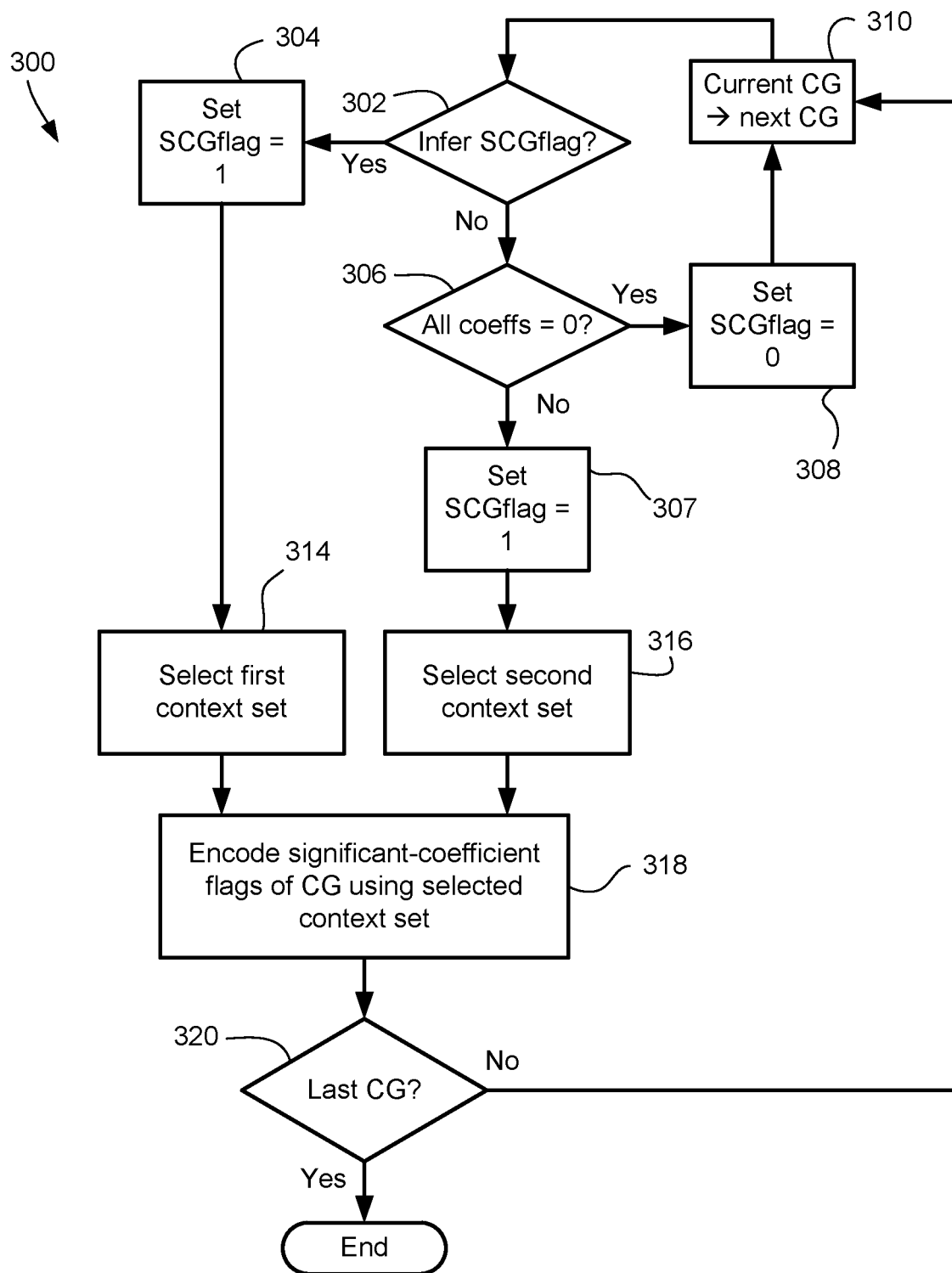
FIG. 11, shows, in flowchart form, an example method of encoding a significance map.

Reference is now made to FIG. 11, which shows an example method 300 of encoding video employing the second embodiment of a process for selecting context sets for encoding significant-coefficient flags.

The method 300 includes, for a coefficient group, i.e. set of significant-coefficient flags, determining whether the significant-coefficient-group flag should be inferred in operation 302. As described above, the context model in this example provides that the significant-coefficient-group flag is inferred to be 1 if the significant-coefficient-group flags of the right-neighbor coefficient group and the lower-neighbor coefficient group are both equal to 1. If that is the case, then in operation 304 the significant-coefficient-group flag of the current coefficient group is set to 1. If that is not the case, then the encoder actually looks at the data in the coefficient group to determine whether there are any non-zero coefficients, as indicated by operation 306. If all the significant-coefficient flags of the current coefficient group are zero, then the significant-coefficient-group flag is set to zero in operation 308. Operation 308 may include encoding the significant-coefficient group flag. Then in operation 310, the encoder moves to the next coefficient group in scan order and returns to operation 302 to start the process over.

If the coefficient group is found to contain at least one non-zero significant-coefficient flag, then in operation 307 the significant-coefficient-group flag is set to 1. Operation 307 may also include encoding the significant-coefficient-group flag.

If the significant-coefficient-group flag was inferred in operation 304, then in operation 314 the first context set is selected. In an embodiment in which there are a large number of defined contexts, and in which the first context set include a predetermined number of those defined contexts, then the selecting of the first context set may be implemented by setting a context index to point to a predetermined one of those defined contexts within the first context set.

If the significant-coefficient-group flag was determined based on whether there were non-zero coefficients in the coefficient group in operation 307, then in operation 316 the second context set is selected. In some implementations, the selection of the second context set includes setting a context index variable to point to one of the defined contexts within the second context set.

Whether using the first context set or the second context set, in operation 318 the selected context set is used for encoding the significant-coefficient flags of the current coefficient group. For the last coefficient group, this may include encoding the DC significant-coefficient flag using its own assigned context, and any other such flags as may have their own context based upon their location in the transform unit. Operation 320 determines whether it is the last coefficient group in the transform unit. If so, then the encoder may go on to the next encoding step with regard to the transform unit (which may include encoding the coefficient levels and/or signs). Otherwise, the encoder moves to the next coefficient group in reverse scan order and repeats the process.

Figure 12:
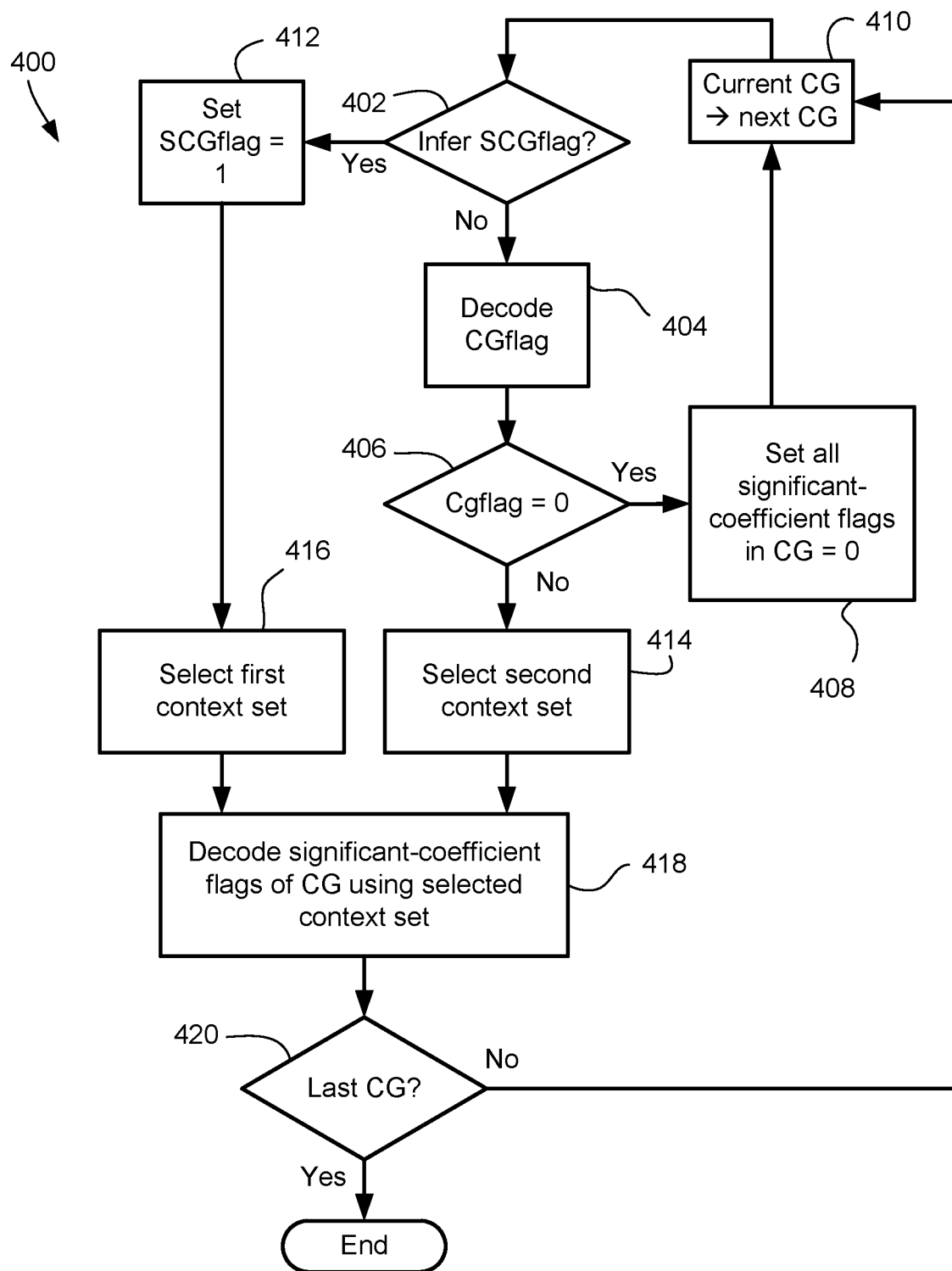
FIG. 12 shows, in flowchart form, an example method of reconstructing a significance map from a bitstream of encoded data.

Reference will now be made to FIG. 12, which shows an example method 400 for decoding a bitstream of encoded video data to reconstruct a significance map for a transform unit. The significance map is partitioned into contiguous sets of significant-coefficient flags, i.e. coefficient groups.

In operation 402 the decoder determines whether the significant-coefficient-group flag for the current coefficient group should be inferred. If so, then in operation 412 it is set to 1. If not, then in operation 404 the significant-coefficient-group flag is decoded from the bitstream. As discussed above, in this example the significant-coefficient-group flag is inferred if the significant-coefficient-group flags for the right-neighbor coefficient group and the lower-neighbor coefficient group are both equal to 1.

In operation 408, if the decoded significant-coefficient-group flag is equal to 0, then in operation 408 all the significant-coefficient flags of that coefficient group are set to 0.

The decoder then moves to the next coefficient group in reverse scan order, as indicated by operation 410, and then repeats the process from operation 402.

If the decoded significant-coefficient-group flag is not zero, then in operation 414 the second context set is selected. If the significant-coefficient-group flag was inferred to be 1, then in operation 416 the first context set is selected. In either case, in operation 418 the selected context set is used to decode the significant-coefficient flags of that coefficient group. Operation 420 involves determining whether it is the last coefficient group and, if so, moving on to the next phase of decoding. Otherwise, the decoder moves to the next coefficient group in reverse scan order and returns to operation 402 to continue the decoding process for significant-coefficient flags.

Below is illustrated one example of the first embodiment of the decoding process using pseudo-code. The first embodiment of the decoding process is one in which the regions are fixed along coefficient group boundaries. This example pseudo-code is but one possible implementation of one possible division of the transform unit into regions.

In the syntax exemplified by the pseudo-code below, if the transform unit size is 16×16 or 32×32 (e.g. log 2TrafoSize>3), then the example process is performed. Note that the specific integer values used below for the index variable sigCtx are examples only of a predetermined index to a large number of defined contexts.

Inputs to this process are the color component index cIdx, the current coefficient scan position (xC, yC), the transform block width log 2TrafoWidth and the transform block height log 2TrafoHeight. The output of this process is ctxIdxInc.

The variable sigCtx depends on the current position (xC, yC), the transform block size and previously decoded bins of the syntax element significant_coeff_flag and significant_coeffgroup_flag. For the derivation of sigCtx, the following applies.

If log 2TrafoWidth is equal to log 2TrafoHeight and log 2TrafoWidth is equal to 2, sigCtx is derived using ctxIdxMap4×4[ ] as follows.

$$sigCtx=ctxIdxMap4\times4[((cIdx>0)?\ 15:0)+(yC<<2)+xC]$$

Otherwise if log 2TrafoWidth is equal to log 2TrafoHeight and log 2TrafoWidth is equal to 3, sigCtx is derived using ctxIdxMap8×8[ ] as follows.

$$sigCtx=((xC+yC)==0)?\ 10:ctxIdxMap8\times8[((yC>>1)<<2)+(xC>>1)]$$

$$sigCtx+=(cIdx>0)?\ 6:9$$

Otherwise if xC+yC is equal to 0, sigCtx is derived as follows.

$$sigCtx=(cIdx>0)?\ 17:20$$

Otherwise (xC+yC is greater than 0), sigCtx is derived using previously decoded bins of the syntax element significant_coeff_flag as follows.

The variable sigCtx is initialized to 0.

When xC is less than $(1<<\log 2TrafoWidth)-1$, the following applies.

$$sigCtx=sigCtx+significant\_coeff\_flag[xC+1][yC]$$

When xC is less than $(1<<\log 2TrafoWidth)-1$ and yC is less than $(1<<\log 2TrafoHeight)-1$, the following applies.

$$sigCtx=sigCtx+significant\_coeff\_flag[xC+1][yC+1]$$

When xC is less than $(1<<\log 2Width)-2$, the following applies.

$$sigCtx=sigCtx+significant\_coeff\_flag[xC+2][yC]$$

When all of the following conditions are true,
yC is less than $(1<<\log 2TrafoHeight)-1$,
xC % 4 is not equal to 0 or yC % 4 is not equal to 0,
xC % 4 is not equal to 3 or yC % 4 is not equal to 2,
the following applies.

$$sigCtx=sigCtx+significant\_coeff\_flag[xC][yC+1]$$

When yC is less than $(1<<\log 2TrafoHeight)-2$ and sigCtx is less than 4, the following applies.

$$sigCtx=sigCtx+significant\_coeff\_flag[xC][yC+2]$$

The variable sigCtx is modified as follows.

If cIdx is equal to 0 and both xC and yC are greater than or equal to $1<<(\max(\log 2TrafoWidth, \log 2TrafoHeight)-2)$, the following applies.

$$sigCtx=((sigCtx+1)>>1)+24$$

Otherwise, the following applies.

$$sigCtx=((sigCtx+1)>>1)+((cIdx>0)?\ 18:21)$$

The context index increment ctxIdxInc is derived using the color component index cIdx and sigCtx as follows.

If cIdx is equal to 0, ctxIdxInc is derived as follows.

$$ctxIdxInc=sigCtx$$

Otherwise (cIdx is greater than 0), ctxIdxInc is derived as follows.

$$ctxIdxInc=27+sigCtx$$

An example syntax for implementing the second embodiment of the decoding process may also be illustrated. The second embodiment is one in which the regions are dynamically determined based on the manner in which the coefficient-group-flag was obtained, i.e. whether through decoding or by way of inference.

The example syntax for the second embodiment may be substantially identical to the syntax shown above for the first embodiment except that the modification to sigCtx, shown just before the derivation of ctxIdxInc, is replaced with:

If cIdx is equal to 0 and at least one of the following conditions is true,
(xC>>2)+(yC>>2) is equal to 0,
(xC<<2) is less than (1<<log 2TrafoWidth−2)−1, (yC>>2) is less than (1<<log 2TrafoHeight−2)−1, and significant_coeffgroup_flag[(xC>>2)+1][yC>>2]+significant_coeffgroup_flag[xC>>2][(yC>>2)+1] is equal to 2,
the following applies.
sigCtx=((sigCtx+1)>>1)+24 Otherwise, the following applies.

sigCtx=((sigCtx+1)>>1)+((cIdx>0)? 18:21)

Figure 13:
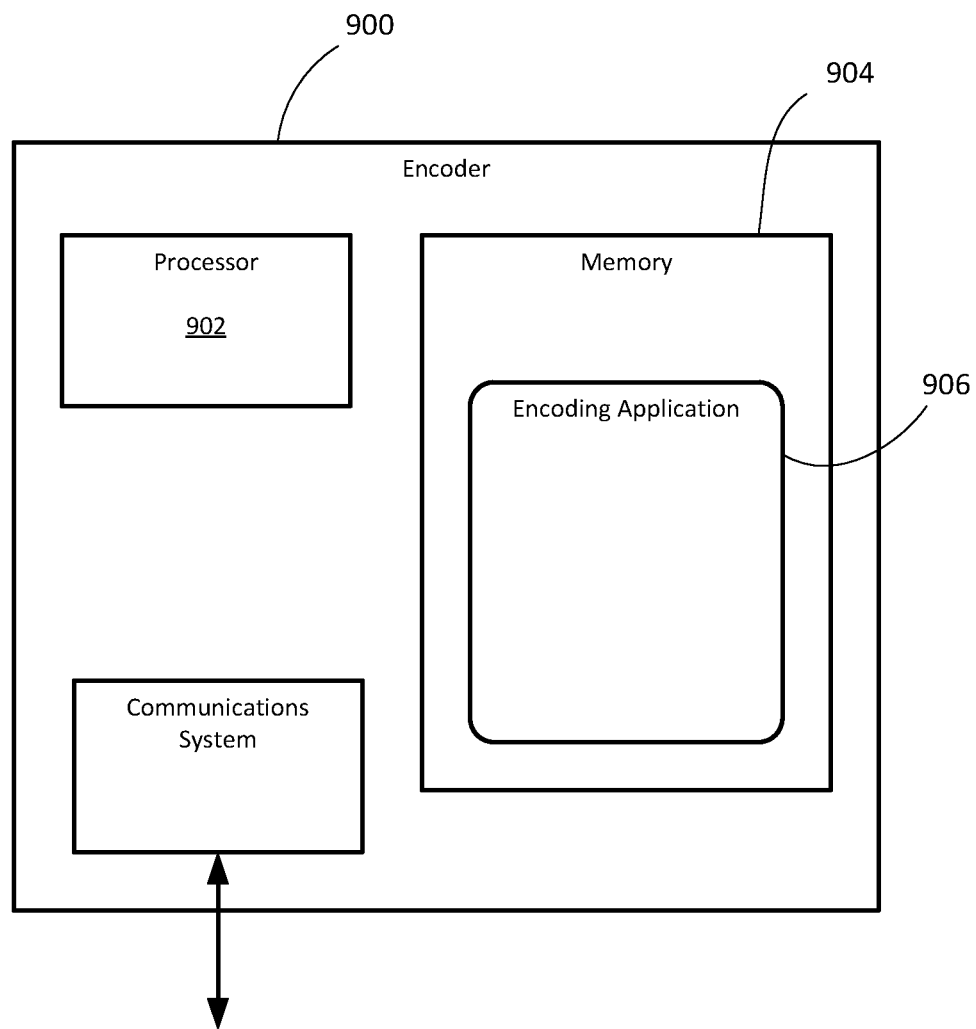
FIG. 13 shows a simplified block diagram of an example embodiment of an encoder.

Reference is now made to FIG. 13, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 14:
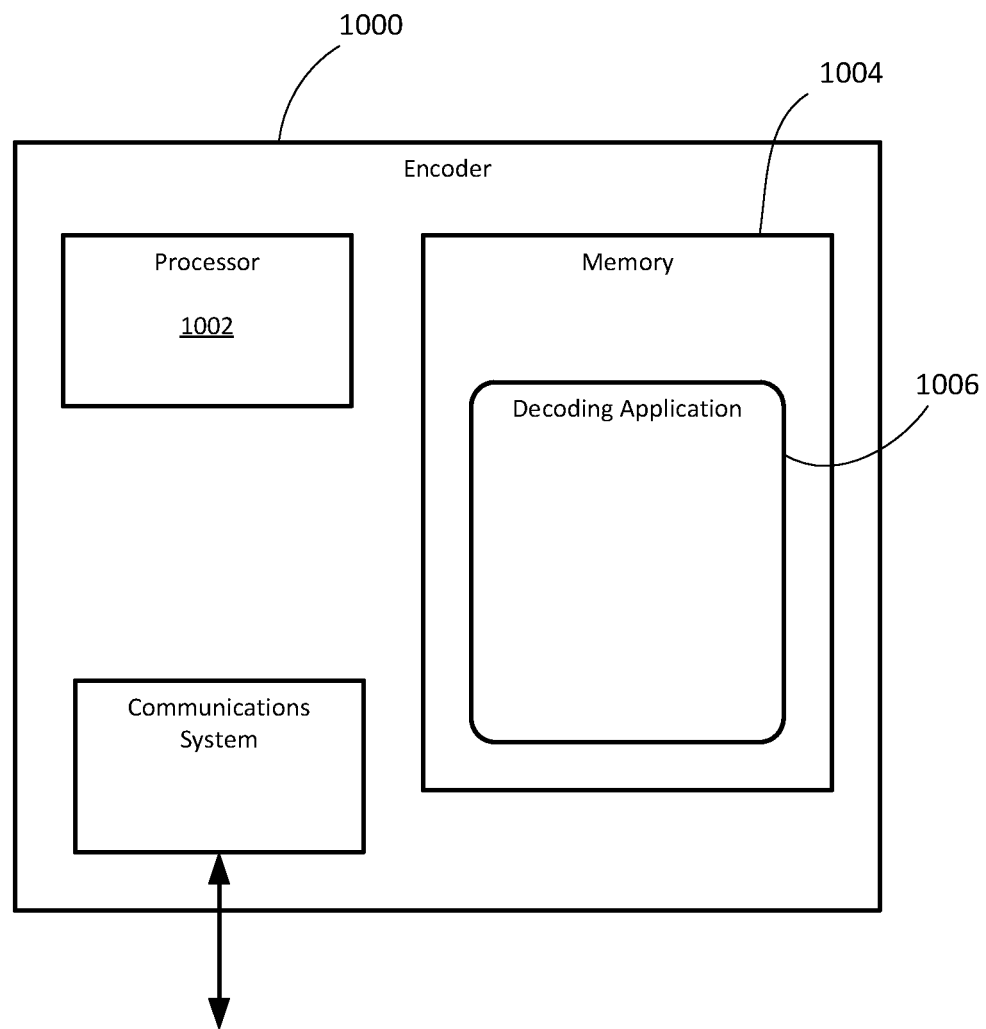
FIG. 14 shows a simplified block diagram of an example embodiment of a decoder.

Reference is now also made to FIG. 14, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. The decoding application 1006 may include an entropy decoder configured to reconstruct residuals based, at least in part, on reconstructing significant-coefficient flags, as described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of encoded video by reconstructing significant-coefficient flags for a transform unit, the transform unit being partitioned into a plurality of non-overlapping blocks, the method comprising:
for each block of the plurality of non-overlapping blocks:
determining whether a significant-coefficient group flag of the block is set;
when it is determined that a significant-coefficient group flag of the block is set:
for a set of significant-coefficient flags corresponding to the block, selecting a context set from a plurality of context sets, each context set including a plurality of contexts, the selecting comprising:
when a position of the block is at the upper-left corner of the transform unit, selecting a first context set from the plurality of context sets, and
when the position of the block is not at the upper-left corner of the transform unit, selecting a second context set from the plurality of context sets; and
entropy decoding each significant-coefficient flag of the set of significant coefficient flags by selecting a respective context from that selected context set.

2. The method claimed in claim 1, wherein the blocks are 4×4, and wherein selecting a context set comprises determining the position by determining whether an x-coordinate and a y-coordinate are each within 4 positions of the upper-left corner of the transform unit.

3. The method claimed in claim 2, wherein the x- and y-coordinate correspond to a first significant-coefficient flag of the set to be decoded in a reverse scan order.

4. The method claimed in claim 1, wherein selecting a context set further includes selecting a specific context for decoding the significant-coefficient flag in the DC position of the set corresponding to the upper-left block in the transform unit.

5. A decoder for decoding a bitstream of encoded data to reconstruct significant-coefficient flags for a transform unit, the transform unit being partitioned into a plurality of non-overlapping blocks, the decoder comprising:
a processor;
a memory; and
a decoding application stored in memory and containing instructions that, when executed by the processor, are to cause the processor to, for each block of the plurality of non-overlapping blocks:
determine whether a significant-coefficient group flag of the block is set;
when it is determined that a significant-coefficient group flag of the block is set:
for a set of significant-coefficient flags corresponding to the block, select a context set from a plurality of context sets, each context set including a plurality of contexts, the selecting comprising:
when a position of the block is at the upper-left corner of the transform unit, select a first context set from the plurality of context sets, and when the position of the block is not at the upper-left corner of the transform unit, select a second context set from the plurality of context sets; and entropy decode each significant-coefficient flag of the set of significant coefficient flags by selecting a respective context from that selected context set.

6. The decoder claimed in claim 5, wherein the blocks are 4×4, and wherein the instructions, when executed, cause the processor to select a context set by determining the position by determining whether an x-coordinate and a y-coordinate are each within 4 positions of the upper-left corner of the transform unit.

7. The decoder claimed in claim 6, wherein the x- and y-coordinate correspond to a first significant-coefficient flag of the set to be decoded in a reverse scan order.

8. The decoder claimed in claim 5, wherein the instructions, when executed, cause the processor to select a specific context for decoding the significant-coefficient flag in the DC position of the set corresponding to the upper-left block in the transform unit.

9. A non-transitory processor-readable medium storing processor-executable instructions which, when executed, cause a processor to decode a bitstream of encoded data to reconstruct significant-coefficient flags for a transform unit, the transform unit being partitioned into a plurality of non-overlapping blocks, wherein the instructions, when executed, cause the processor to:

for each block of the plurality of non-overlapping blocks:
determine whether a significant-coefficient group flag of the block is set:
when it is determined that a significant-coefficient group flag of the block is set:
for a set of significant-coefficient flags corresponding to the block, select a context set from a plurality of context sets, each context set including a plurality of contexts, the selecting comprising:
when a position of the block is at the upper-left corner of the transform unit, select a first context set from the plurality of context sets, and
when the position of the block is not at the upper-left corner of the transform unit, select a second context set from the plurality of context sets; and
entropy decode each significant-coefficient flag of the set of significant coefficient flags by selecting a respective context from that selected context set.

10. A method of encoding a video by encoding significant-coefficient flags for a transform unit to create a bitstream of encoded sets of significant-coefficient flags, the transform unit being partitioned into a plurality of non-overlapping blocks, the method comprising:

for each block of the plurality of non-overlapping blocks:
determining whether a significant-coefficient group flag of the block is set:
when it is determined that a significant-coefficient group flag of the block is set:
for a set of significant-coefficient flags corresponding to the block, selecting a context set from a plurality of context sets, each context set including a plurality of contexts, the selecting comprising:
when a position of the block is at the upper-left corner of the transform unit, selecting a first context set from the plurality of context sets, and
when the position of the block is not at the upper-left corner of the transform unit, selecting a second context set from the plurality of context sets; and
entropy encoding the significant-coefficient flags of the set of significant coefficient flags by selecting a respective context from that selected context set.

11. The method claimed in claim 10, wherein the blocks are 4×4, and wherein selecting a context set includes determining the position by determining whether an x- and y-coordinate is within 4 positions of the upper-left corner of the transform unit.

12. The method claimed in claim 11, wherein the x- and y-coordinate correspond to a first significant-coefficient flag of the set to be encoded in a reverse scan order.

13. The method claimed in claim 10, wherein selecting a context set further includes selecting a specific context for encoding the significant-coefficient flag in the DC position of the set corresponding to the upper-left block in the transform unit.

14. An encoder for encoding significant-coefficient flags for a transform unit to create a bitstream of encoded sets of significant-coefficient flags, the transform unit being partitioned into a plurality of non-overlapping blocks, the encoder comprising:

a processor;
a memory; and
an encoding application stored in memory and containing instructions that, when executed, are to cause the processor to, for each block of the plurality of non-overlapping blocks:
determine whether a significant-coefficient group flag of the block is set:
when it is determined that a significant-coefficient group flag of the block is set:
for a set of significant-coefficient flags corresponding to the block, select a context set from a plurality of context sets, each context set including a plurality of contexts, the selecting comprising:
when a position of the block is at the upper-left corner of the transform unit, select a first context set from the plurality of context sets, and
when the position of the block is not at the upper-left corner of the transform unit, select a second context set from the plurality of context sets; and
entropy encode the significant-coefficient flags of the set of significant coefficient flags by selecting a respective context from that selected context set.

15. The encoder claimed in claim 14, wherein the blocks are 4×4, and wherein the instructions, when executed, cause the processor to select a context set by determining the position by determining whether an x- and y-coordinate is within 4 positions of the upper-left corner of the transform unit.

16. The encoder claimed in claim 15, wherein the x- and y-coordinate correspond to a first significant-coefficient flag of the set to be encoded in a reverse scan order.

17. The encoder claimed in claim 14, wherein the instructions, when executed, cause the processor to select a specific context for encoding the significant-coefficient flag in the DC position of the set corresponding to the upper-left block in the transform unit.

18. A non-transitory processor-readable medium storing processor-executable instructions which, when executed, cause a processor to encode significant-coefficient flags for a transform unit to create a bitstream of encoded sets of significant-coefficient flags, the transform unit being partitioned into a plurality of non-overlapping blocks, wherein the instructions, when executed, cause the processor to:

for each block of the plurality of non-overlapping blocks:
determine whether a significant-coefficient group flag of the block is set:
when it is determined that a significant-coefficient group flag of the block is set:
for the set of significant-coefficient flags corresponding to the block, select a context set from a plurality of context sets, each context set including a plurality of contexts, the selecting comprising:
when a position of the block is at the upper-left corner of the transform unit, select a first context set from the plurality of context sets, and
when the position of the block is not at the upper-left corner of the transform unit, select a second context set from the plurality of context sets; and
entropy encode the significant-coefficient flags of the set of significant coefficient flags by selecting a respective context from that selected context set.

\* \* \* \* \*